350-404
XR 3,451,751
SR

June 24, 1969     M. D. STOCK     3,451,751
DISPLAY LIGHT

Filed Oct. 31, 1966             Sheet 1 of 2

INVENTOR.
MALCOLM D. STOCK
BY HIS ATTORNEY

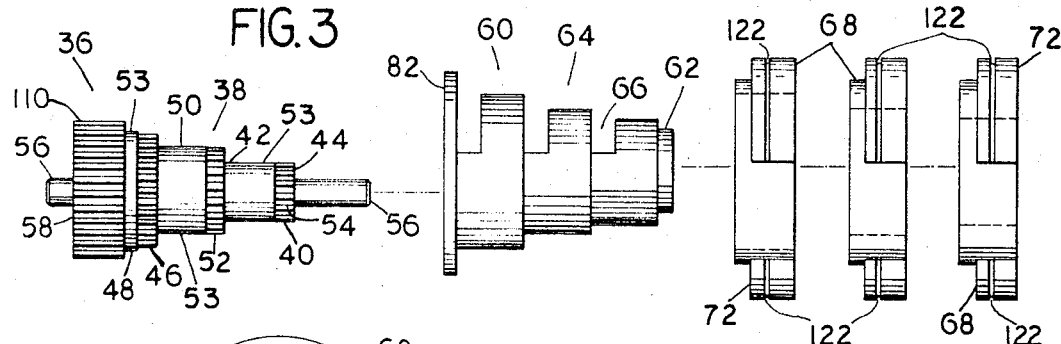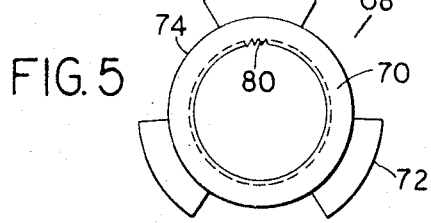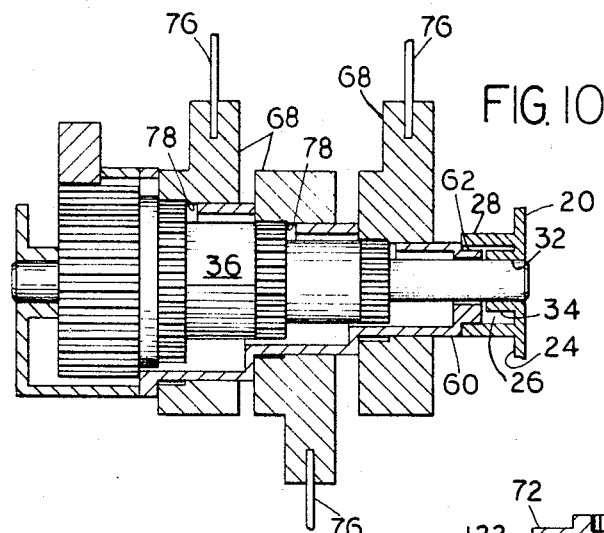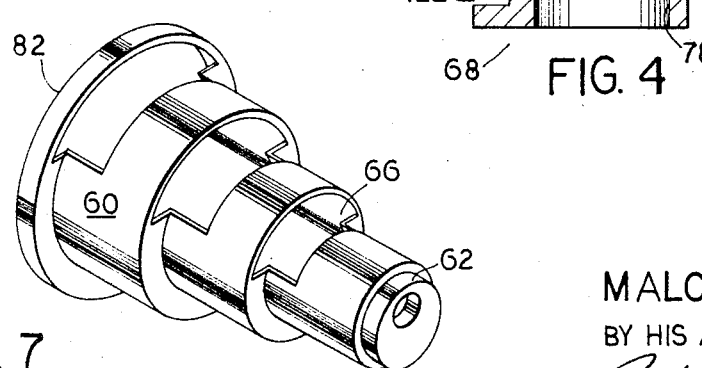

United States Patent Office 3,451,751
Patented June 24, 1969

3,451,751
DISPLAY LIGHT
Malcolm D. Stock, 157—27 89th St.,
Howard Beach, N.Y. 11414
Filed Oct. 31, 1966, Ser. No. 595,561
Int. Cl. G03b *21/14*
U.S. Cl. 353—20          10 Claims

ABSTRACT OF THE DISCLOSURE

A display device comprising a first polarizing screen adapted to be rotated, a plurality of rotatable holding elements mounted on the housing, the rotatable holding elements adapted to releasably receive birefringent elements. A plurality of spindle gears respectively connected to said plurality of holding elements for providing a continually variable rotatable ratio of birefringent elements, the birefringent elements being in close spaced rotatable relationship. A second polarizing screen adapted to rotate, and a light source providing light which passes through the rotatable first and second polarizing screens and rotatably mounted birefringent elements thereby creating design and color changes.

---

Figure 9:
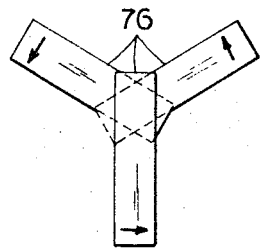

The present invention relates to a display means and more particularly to a device for displayiug varied color designs.

Heretofore, various attempts have been made to provide a reasonably sized and priced display device which will provide a large number of varying designs sequentially. Many display devices have been provided, however, these currently marketed devices are generally limited to the display of a specific name or to the display of a few repetitive color varied designs and not to abstract and or balanced designs which may be widely varied. Further, when a larger number of designs were required, the mechanisms became large in size so that they were somewhat cumbersome.

The principles discussed in U.S. Patents 2,169,022 and 2,393,968, wherein large numbers of color variations might be obtained, as well as, color variable designs might be further enjoyed through the use of polarized light, birefringent materials and in conjunction with acetate and gelatine color filters, have long escaped use in a properly oriented and minimal cost display device.

It is the general object of the present invention to avoid and overcome the foregoing and other difficulties found in prior art devices and to provide a low cost and easily manufactured color display device.

Another object of the present invention is to provide a display device wherein a plurality of color designs and variations may be created and displayed.

A further object of the present invention is to provide a display device wherein the user may himself add or subtract elements to either increase or vary the color variations.

Yet a further object of the present invention is to provide a mechanism wherein the principles of polarized light and its cooperation with partial and/or fully birefringent material are mechanically combined to provide a sequential display of many different designs and color variations thereof.

Still another object of the present invention is to provide a display device wherein a unique gear arrangement permits the rotation of elements, at different speeds, giving rise to the creation of the varying color designs.

Another object of the present invention is to provide a display device wherein varyingly shaped birefringent elements may be used to aid in the creating and varying of many different designs and color displays.

The objects of the present invention have been achieved by providing a display device comprising a housing means, a light source disposed in said housing means, a reflector adjacent said light source for directing the light in a general direction, a first polarizing screen rotatably connectible to said housing and in the path of the generally directed light, a plurality of spindle gears rotatably connected to said housing, spindle gear housing means covering said spindle gear having apertures therein for exposing a portion of each of said spindle gears, holding means rotatably mounted on said spindle gear housing for rotatively maintaining color creating elements at staggered levels to permit overlapping of birefringent elements, a frame portion in fixed spaced relation to said housing means and rotatably supporting each of said spindle gears, a second polarizing screen mounted for rotation on said frame portion and engageable with each of said spindle gears, and motive means in communication with said second polarized screen for rotating said second polarized screen.

Figure 1:
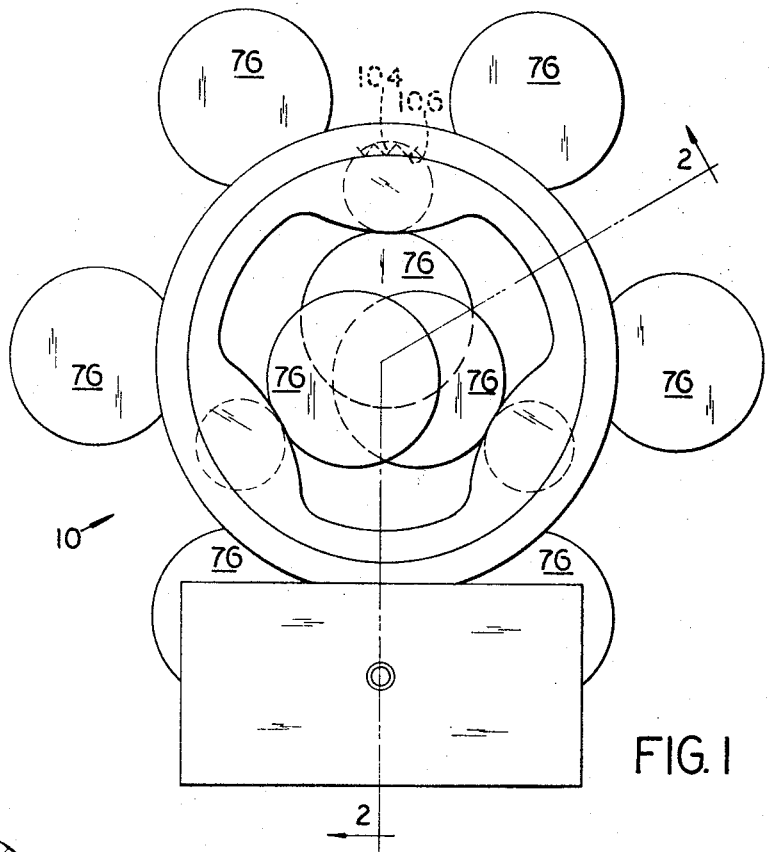
Figure 2:
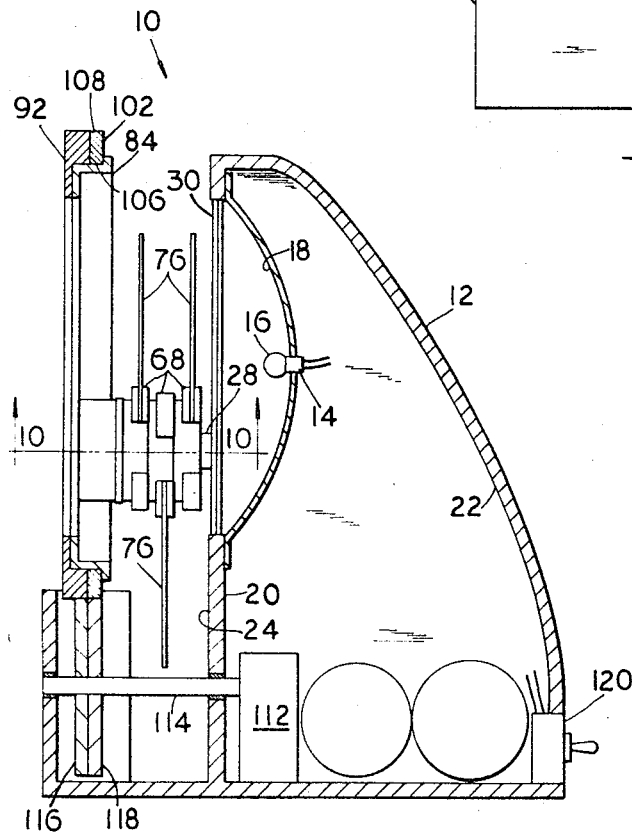
Figures 6, 6A:
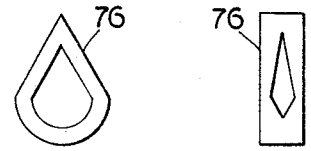

For a better understanding of the present invention reference should be had to the accompanying drawings wherein like numerals of reference indicate similar parts throughout the several views and wherein:

FIGURE 1 is a front view of one form of the present invention,

FIGURE 2 is a cross sectional view of the present invention taken along lines 2—2 of FIGURE 1, FIGURE 3 is an exploded view of the gear arrangement, FIGURE 4 is a sectional view of one of the holding means, FIGURE 5 is a front view of one of the holding means, FIGURES 6A–6B are plan views of various forms of the birefringent elements used, FIGURE 7 is a perspective view of the spindle gear housing, FIGURE 8 is a cross sectional view of the second frame, FIGURE 9 is a pictorial representation of the overlapping birefringent materials, and FIGURE 10 is a cross sectional view of the spindle gear and spindle gear housing.

Although the principles of the present invention may be broadly applicable to other types of display devices, it is particularly adapted to a dislay device or night light using the principle of polarized light in cooperation with birefringent materials, and hence it has been illustrated and will so be described.

It has been well established, as described in the United States Patent No. 2,393,968, that birefringent crystals or thin sheets of birefringent plastic material such as cellophane, and Scotch tape, partially or fully oriented, when placed between two sheets of polarizing material, a suitable orientation with respect to the directions of polarization, the birefringent will appear to be colored.

It is further known that by changing the direction of one polarizer, the same birefringent material will appear to have yet another color. Therefore, by changing the direction of the polarized light impinging on the birefringent material, that material will appear to undergo color variations. By shining a beam of light through the polarizers and birefringent materials or suitable lens systems the color variations may be projected. The varying color appearances are known to be a cause of the varied strain in the material and the variance in the thickness of the birefringent material.

It should be particularly understood that the essence of the present invention is not the theory and principle of creating color variations by the use of polarized light and partial or wholly birefringent materials, but the invention resides in the practical and mechanical execution of that theory for providing a multitude of color varied designs for use as a display device or night light.

Referring now to FIGURE 2, a display device is shown and is indicated generally by the reference numeral 10. Although the housing 12 is shown as generally oval shaped, it is to be understood that the invention is not limited by the shape herein shown since the housing 12 may take whatever convenient configuration dictated by spacial requirements.

In order to observe the varying color designs, a light source 14 may be provided and may take the form of a light bulb 16 set within a parabolic reflector 18. The parabolic reflector 18 is preferred as a means of directing the light generated from the light source 14, in one general direction thereby concentrating the light. A power source may be provided and may be connected to the light source 14 to provide the necessary power, in any convenient manner well known to those skilled in the art.

The housing means 12 may be provided with a front portion 20 and a rear portion 22. The front portion 20 of the housing 12 may be provided with a rim 24. Disposed on the rim 24 there may be provided a plurality of recesses 26 which are provided individually with a raised ridge 28 therearound. The rim 24 may further be adapted to receive a first polarizing screen 30 which is capable of rotation, if desired. As shown in FIGURE 10 each recess 26, in the rim 24, may be provided with a hole 32 in its approximate center and each hole 32 may have an upwardly extending ridge 34 therearound. The invention herein shown utilizes three recesses 26 approximately 120 degrees apart from each other, the purposes of which will be more fully described hereafter. Each hole 32 may be adapted to receive a rotatable spindle gear 36 such that the spindle gear 36 may freely rotate within each of the recesses 26 and be held in rotating alignment in the hole 32. The upwardly extending ridge 34 around each hole 32 may vary in height from one recess 26 to another recess 26 such that each spindle gear 36 may be held a different distance from the rim 24. The significance of this factor may be more fully understood as the hereinafter description proceeds.

As shown in FIGURE 3, the spindle gear 36 may be provided with a plurality of steps 38 graduating from a small gear 40 on a portion of the first step 42 on the front end portion 44 of the spindle gear 36 to a larger gear 46 on a portion of the third step or last step 48. Intermediate steps such as the second step 50 may be provided with intermediate sized gears 52 which may also be disposed on a portion of any one of the intermediate steps, herein shown as the second step 50. Each of the steps 38 is not only provided with a gear thereon but also has a cylindrical portion 53 free of gear teeth 54. It will be particularly understood that although the three spindle gears shown in use herein employ three steps 38, more or less steps 38 may be employed and each step may contain varying numbers of gear teeth 54 to alter speed ratios. And further, blank areas on the varying gear may be provided so that no movement is engendered during rotation of the spindle gears 36.

Structurally, stud shafts 56 may be provided on the front end portion 44 and rear end portion 58 of the spindle gear 36 to provide an axis of rotation for the spindle gear 36.

In order to support the spindle gear 36 in proper rotative alignment and to mask the various gear steps 36 each recess 26 may be provided with a spindle gear housing 60 of unique construction. Each spindle gear housing 60 may be adapted to fit over each spindle gear 36 with its front end 62 being capable of fitting in the recess 26 on the rim 24 of the housing 12. The spindle gear housing 60 may be provided with several sections 64 each section adapted to receive the graduated succeeding steps 38 of the spindle gear 36. Each of the several sections 64 of the spindle gear housing 60 is provided with an elongated slot 66 therein such that a portion of the gears 40, 46, 52 on the respective steps 38 may be exposed during rotation. With this arrangement of parts it may be seen that all of the gears 40, 46, 52 on the spindle gear 36 will be exposed at one point along the spindle gear housings 60.

As shown in FIGURES 3 and 10 each step of the spindle gear housing 60 may be adapted to receive a meshing holding element 68 which may fit over the respective steps and engage the gear teeth 54 exposed through the elongated slot 66 so that the holding element 68 may rotate in accordance with the step gear to which it is meshed. As shown in FIGURES 4 and 5 the holding element 68 is shown therein and comprises in essence a cylindrical shaped body portion 70 having protrusions 72 on its outer periphery 74 for holding plastic or birefringent elements 76. Although partially and wholly oriented birefringent materials such as cellophane have been used, the present invention contemplates the use of materials such as polyvinyl chloride, vinyl acetate, cellulose acetate and glass as well as the previously mentioned materials. A portion of the inner surface 78 of the holding element 68 is provided with a plurality of gear teeth 80 which mate with the respective gear teeth 54 on the steps 38 on which the holding element 68 is adapted to fit. It is seen therefore that the inner surface 78 of each holding element 68 rotatably rides on the outer surface of the spindle gear housing 60 on each of the several sections 64, each holding element 68 having an inside diameter slightly larger than the outside diameter of the respective step on which it is mounted.

In order to hold birefringent elements 76 in a releasably fixed position, the protrusions 72 may be provided with slits 122 such that the birefringent elements 76 may be easily slipped in or out thereof and yet when the material is inserted therein the slit 122 will be sufficient to engage the material to hold it in a relatively fixed position. Here again, although slits 122 are shown in the drawings for holding the birefringent elements 76, other means may be provided that will perform the same releasable holding function, for example, a clamping arrangement, a "snap on" clamp, or slit may go around the holder. It should be recognized that the present form of the invention, i.e. the slits 122, are preferred, however, this feature may be changed without departing from the essence of the invention.

Viewing the structural relationship of elements thus far recited, it will be seen that a spindle gear housing 60 may be mounted in each of the recesses 26 around the rim 24 on the front portion 20 of the housing 12. Each spindle gear housing 60 has mounted thereon the holding elements 68, on each of its several stepped sections 64. Disposed within each of the spindle gear housings 60 the spindle gear 36 is inserted such that the stud shaft 56 on the front end portion 44 thereof fits into the hole 32 in the recess 26, and is free to rotate therein. As previously seen the various gear teeth 54 on the gears 40, 46, 52 will mesh with the gear teeth 80 on the inner surface 78 of the respectively mounted holding elements 68 through the elongated slots 66 such that when the spindle gear 36 rotates the holding elements 68 will also rotate.

For the sake of manufacturing convenience the spindle gears 36 may be of standard size with only the number of gear teeth 54 being changeable. Similarly, the holding elements 68 may also be made of standardized dimensions, however, it may be seen that this feature is not a strict requirement. It may be seen that varying sized spindle gear 36 might be used to alter the gear ratios and thereby change the relative speeds of rotation of the holding elements, as well as the number of gear teeth 54. The flexibility of changing the relative speeds and gear ratios lends itself to varying color and design changes of the display device or night light. Hence, additional variable leads to the possible continued variation of the created designs.

In order to provide a means of supporting the rear end of the spindle gear housings 60 so that the spindle gears 36 may rotate therein on its proper axis of rotation as defined by the stud shafts 56, a second frame member 84 may be mounted to the housing 12 and in spaced relationship thereto. The second frame member 84 may be provided with a wall means 86 connected in spaced relationship therewith such that a screen 88, of any suitable material, may be slidingly mounted on the second frame 84. The screen 88 may be provided to further vary the colors and designs created or may provide a fixed design wherein the colors may be varied. The possible use of the screen 88 further adds a greater degree of flexibility in creating and color varying designs or fixed conformations. The wall means 86 and second frame member 84 may be provided with a flat front surface 90 on which a second polarizing screen 92 may be fixedly or rotatably mounted. The inner surface of the second frame member may be provided with a plurality of recesses 94 which are in alignment with the recesses 26 on the rim 24 of the housing 12. These recesses are provided to support the rear end 82 of the spindle gear housing 60. With these recesses 94 there is provided a hole 96 which will accept the stud shaft 56 at the rear end portion 58 of the spindle gear 36 and thereby hold the spindle gear 36 in proper axial rotative alignment. Each hole 96 may have a downwardly extending ridge 98 therearound.

The second frame member 84 may be provided with a ridged outer periphery 100 such that a large inner gear member 102 may rotatably rest thereon and at the same time rotatably support the second polarizing screen 92. The gear member 102 may be provided with gear teeth 104 on its inner rim 106 and may be provided with a knurled outer surface 108. The gear teeth 104 may engage a mating gear arrangement 110 mounted on the rear end portion 58 of each spindle gear 36. It may be recognized therefore that when the large gear member 100 is rotated, the individual spindle gears 36 will rotate within their respective spindle gear housings 60, because the rear end portion 58 of each spindle gear 36 is in communication with the inner rim 106 of the gear member 102. The spindle gears 36 may be rotated through a friction drive rather than the gear arrangement hereinbefore described without departing from the essence of the invention.

As shown in FIGURE 2 a motive force, in the form of an electric motor 112 may be mounted within the housing 12 and may be provided with an extended shaft 114. Mounted on the shaft 114 there may be provided a pair of cams 116 and 118. The first cam 116 may frictionally engage the knurled outer surface 108 of the large gear member 102 and the second cam 118 may be in contact with the second polarizing screen 92. Structurally therefore, when the motive force or electric motor 112 is activated, the frictional engagement of the cams 116, 118 to the large gear member 102 and second polarizing screen 92 will cause these latter members to rotate resulting in the rotation of the spindle gear means 36 and the constant reorientation of the second polarizing screen 92. An "on-off" switch 120 may be provided to control the operation of the electric motor 112 and may be connected thereto in any convenient manner.

It may be seen that the electric motor 112 may be dispensed with and that a crank (not shown) may be provided so that manual operation is used rather than the automated turning as hereinbefore described. In either case however, whether manually or electrically operated, the principle of operation remains the same and the essence of the invention is not changed.

Operationally, birefringent elements 76, having varying shapes, as shown in FIGURES 6A–6B may be releasably secured in the slits 122 provided in the protrusions 72 of each holding element 68. Since the spindle gears 36 and holding elements 68 are of standard construction, it would appear that the birefringent elements 76 might interfere one with the other as the holding elements 68 rotate. However, the upwardly extending ridges 34 around the holes 32 and the downwardly extending ridges 98 around the holes 96 of the second frame member 84 may be sufficiently varied in their height such that the spindle gears 36 and holding elements 68 on the various steps 38 may be sufficiently offset to avoid any interference in the rotation of the birefringent elements 76. With this proper offsetting feature at each of the levels of the various steps 38, an overlapping of birefringent material will occur, as shown in FIGURE 9.

With birefringent elements 76 positioned in the slits 122 of the rotating holding elements 68 various color and designs will be projected and formed on the second polarizing screen 92. Since varyingly shaped birefringent elements 76 may be utilized, continually changing surfaces and edges are passing intermittently before the light source 14 resulting in changing color designs. Further, the constant rotation of the second polarizing screen 92 reorienting the light emanating from the light source 14 will further add to the multiplicity of color and design.

Referring now to FIGURE 9 wherein is shown the overlapping of three birefringent elements, the arrows indicate the direction of orientation of each element. It may be seen that when all the elements are in the same direction the colors created (when viewed through the second polarizing screen 92) may be red where the three elements overlap and pink where only two elements 76 overlap. By changing the direction of orientation of one of the birefringent elements 76, a further color variation may be obtained and further if the shape of one of the birefringent elements 76 is changed a different overall design may be obtained. Similar designs may be repeated by leaving similar shaped elements 76 in the various holding elements 68, however, the colors created within the design may be varied by varying the orientation of the birefringent elements 76 in their holding elements 67. Similarly, the same color combinations may be repeated by maintaining a fixed orientation of the birefringent elements 76 with respect to the second polarizing screen 92 but the designs may be changed by merely placing the birefringent elements 76 in different positions in the holding elements 68.

To this end the birefringent elements 76 may be coded so that when each is placed on a specifically marked holding element 68 of a specific spindle gear 36 predictable designs and color combination may be obtained. This may be extremely valuable for the commercial application of this invention.

Although the above described invention has been generally applied to the creation of designs and color variations therefor which would be seen on the second polarizing screen 92, a suitable lens arrangement (not shown) may be provided over the second polarizing screen 92 whereby the created designs may project to a screen or other suitable area for mass display purposes. The type of lens system and system of projection may be well known to those skilled in the art.

The use of gears has been described herein as the co-acting related forces which move the various elements to provide the desired color and design variations. However, frictional contact between these various elements may, if desired, be utilized to eliminate these gear arrangements and thereby provide a display device 10 which would be free from gears and yet would provide the necessary co-operation of elements that would accomplish the same results and objects. Where repetitive designs are desired, gears must be used.

It will be recognized by those skilled in the art that the principal means of creating varying designs may be achieved by varying the relative speeds at which the birefringent elements 76 pass each other on the same level (or step) and this may be governed by the gear ratios in respect to the large gear member, as well as the gear ratios of the various steps 38, so that a high degree of relative speed variations will engender a more prolific creation of varying color and designs, whether balanced or in the abstract. By reversing the direction of rotation of large gear member 102, the direction of rotation of the holding means 68 may be also changed thereby providing further changes in the relative speed and motion of the rotating of the birefringent elements 76. This function may be easily accomplished by a mere variation of the turning of gear elements.

In order to change the various speed ratios it is certainly within the competency of a person of ordinary skill to make the gear changes, especially when varying types of gears may be provided the user of the display device 10. Further, by purchasing birefringent material, which is freely available, he may create new shapes of the birefringent elements 76 and thereby increase the possible color and design changes.

It will be recognized by those skilled in the art that the objects of the present invention have been achieved by providing a new and novel display and/or night light which permits a high degree of flexibility in the creation of balanced and abstract designs and a means of varying the colors created therein through the use of wholly or partially oriented birefringent elements in conjunction with a plurality of polarizing screens.

While in accordance with the patent statutes preferred (and alternative) embodiments of the present invention have been illustrated and described in detail, it is to be particularly understood that the invention is not limited thereto or thereby.

I claim:

1. A display device comprising a housing having a rear portion and a front portion, a light source disposed within said housing, a first polarizing screen rotatably connected to the front portion of said housing, a plurality of spindle gears rotatably connected to said housing, a plurality of holding elements rotatably mounted on each of said spindle gears, birefringent elements releasably connected to said holding elements and capable of being rotated in front of said light source and first polarizing screen, said birefringent elements being rotated and overlapping each other during their rotative movement, a second frame member in spaced relation to said housing and in communication with said spindle gears maintaining said plurality of spindle gears in spaced relationship, a large gear member rotatably mounted on said second frame member and in engagement with said plurality of spindle gears for imparting rotative motion to said plurality of spindle gears, a second polarizing screen mounted on said second frame member and being capable of rotating, a motive member disposed within said housing, and a plurality of cams connected between said motive member and said large gear member and said second polarizing screen for imparting independent motion to said large gear member and said second polarizing screen, said light source providing light which passes through the rotatable first and second polarizing screens and rotatably mounted birefringent elements thereby creating design and color changes.

2. A display device according to claim 1 wherein said birefringent elements are of varying shapes and are capable of being releasably held in varying positions by said holding elements thereby varying the created designs.

3. A display device according to claim 2 wherein each of said spindle gears is provided with a plurality of steps, said steps being graduated in size from the front end of said spindle gear to the rear end portion thereof, each of said steps being provided with a gear thereon and a cylindrical portion, a gear arrangement disposed on the rear end of said spindle gear for engagement with said large gear member, and a stud shaft connected to the front end and rear end portion of said spindle gear.

4. A display device according to claim 3 wherein each of said spindle gears is provided with a spindle gear housing, said spindle gear housing comprising a hollow member having several stepped sections adapted to receive said spindle gear therein, each of the purality of steps on said spindle gear adapted to be rotatably received in one of the several steps of said spindle gear housing, each of the several sections of said spindle gear housing having an elongated slot therein permitting the gear on each step of said spindle gear to protrude through the respective elongated slot in said spindle gear housing, said spindle gear housing being provided with a front end and a rear end, and each of said several steps being provided with a cylindrical portion thereon capable of supporting said holding elements for rotation.

5. A display device according to claim 4 wherein each of said holding elements is provided with a cylindrical body portion having a hole in the center thereof, said hole adapted to fit over a respective step on said spindle gear housing, gear teeth disposed around a portion of said hole and adapted to engage said gears protruding through said elongated slot on the step of said spindle gear housing, said holding element being provided with a plurality of protrusions each of which is adapted to releasably hold a birefringent element.

6. A display device according to claim 5 wherein each of said plurality of protrustions is provided with a holding means for releasably holding at least one birefringent element for rotation.

7. A display device according to claim 6 wherein said holding means on each of said plurality of protrusions is in the form of a slit adapted to receive a birefringent element which is to be releasably held for rotation.

8. A display device according to claim 7 wherein said front portion of said housing is provided with a rim, said rim having a plurality of recesses therein, each of said recesses being provided with a raised ridge therearound the height of which is variable from one recess to another, each of said recesses having a hole therein with an upwardly extending ridge therearound, each of said recesses adapted to receive the front end of said spindle gear housing holding said spindle gear housing in a fixed position, said hole adapted to receive the stud shaft extending from said front end portion of said spindle gear.

9. A display device according to claim 8 wherein said second frame member is provided with a plurality of recesses in alignment with the recesses disposed on said rim, said recesses adapted to receive the rear end portion of said spindle gear housing, said large gear member rotatably mounted on said second frame member and communicating with said gear arrangement on the rear end of spindle gear, said second polarizing screen rotatably mounted on said second frame member.

10. A display device according to claim 9 wherein said second frame mmber is provided with wall means for retaining a screen which is removably insertable.

References Cited

UNITED STATES PATENTS

| 2,393,968 | 2/1946 | Burchell et al. | 350—158 |
| 2,586,635 | 2/1952 | Fernsler | 88—24 |
| 2,763,078 | 9/1956 | Graves | 350—158 |
| 3,131,253 | 4/1964 | Zandman et al. | 350—158 |
| 3,218,919 | 11/1965 | Sturner et al. | 88—24 |

NORTON ANSHER, *Primary Examiner.*

RICHARD M. SHEER, *Assistant Examiner.*

U.S. Cl. X.R.

40—34; 350—158, 159